H. T. DURANT.
APPARATUS FOR BRINGING A GAS INTO CONTACT WITH A LIQUID.
APPLICATION FILED OCT. 14, 1910.
999,213. Patented Aug. 1, 1911.
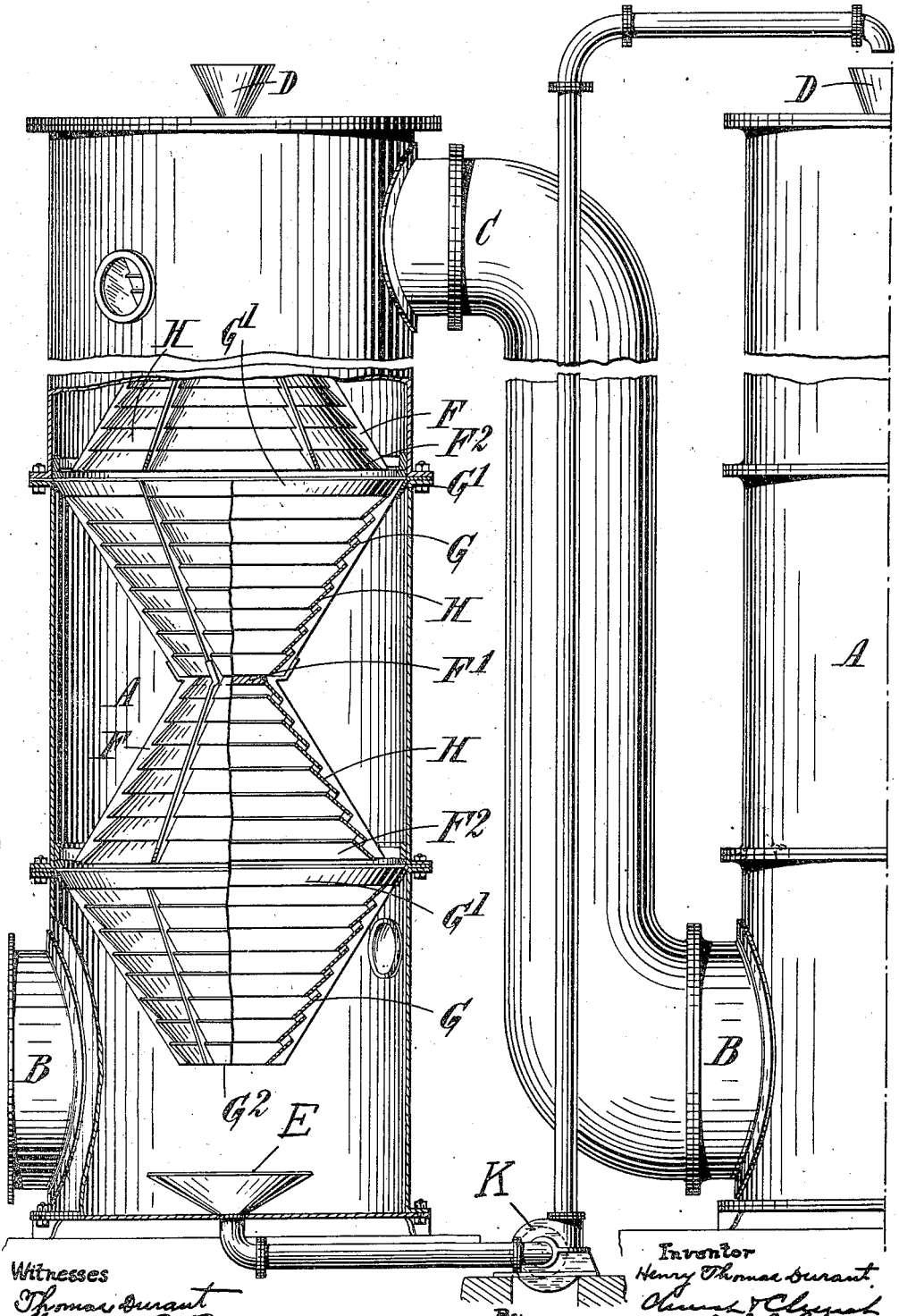

UNITED STATES PATENT OFFICE.

HENRY THOMAS DURANT, OF LONDON, ENGLAND, ASSIGNOR TO THE METALS EXTRACTION CORPORATION LIMITED, OF LONDON, ENGLAND.

APPARATUS FOR BRINGING A GAS INTO CONTACT WITH A LIQUID.

999,213.

Specification of Letters Patent.

Patented Aug. 1, 1911.

Application filed October 14, 1910. Serial No. 587,100.

*To all whom it may concern:*

Be it known that I, HENRY THOMAS DURANT, a subject of the King of England, residing at London, England, have invented certain new and useful Improvements in Apparatus for Bringing a Gas into Contact with a Liquid, of which the following is a specification.

This invention relates to improvements in apparatus for bringing a gas into contact with a liquid, for example it may be used for treating an ore suspended in water with a gas such as sulfur dioxid, or it may be used for drying gases by bringing them into intimate contact with a hygroscopic liquid, or the apparatus may be used in any other industrial process in which a liquid with or without solid matter in suspension has to be brought into intimate contact with a gas for solution, evaporation or other purposes.

A tower for bringing the gas into intimate contact with a liquid according to this invention comprises the combination with a vertical receptacle having an inlet near the bottom for the gas and an inlet at the top for the liquid and slightly truncated conical or pyramidal "contact elements" each comprising a series of over-lapping conical or pyramidal rings spaced apart and so arranged that the liquid has to run over the rings in succession while the gas is forced to pass through the liquid between the rings. Preferably the "contact-elements" are alternately upright and inverted pyramids so that the liquid in falling is alternately moved from the center of the tower to the periphery and vice versa. The apexes of the upright pyramidal "contact elements" are closed and the bases of the inverted elements extend to the periphery of the tower so that the gas in ascending through the tower is alternately forced to pass into the inverted "contact elements" and out from the upright "contact elements".

The accompanying drawing illustrates in elevation partly in section one form of apparatus embodying this invention.

The apparatus will be described particularly with reference to its use for bringing roasted sulfid ore containing zinc and suspended in water into intimate contact with a gas containing $SO_2$ such as roasting furnace gas for the purpose of causing the zinc to go into solution as bisulfite.

A high vertical tower A conveniently of wood or metal lined if necessary, with suitable resisting material has an inlet B for gas at the bottom and an outlet C for gas at the top, an inlet D for liquid and ore at the top and an outlet E at the bottom for undissolved solid matter and solution. Within the tower A are a number of "contact elements" F and G, that is to say, arrangements of baffles H for the purpose of bringing the liquid or pulp into intimate contact with the gas. There are two kinds of these "contact elements." One consists of an upright or pyramidal "contact element" F (closed at the upper end which is truncated) and comprising a series of overlapping pyramidal or conical rings G spaced apart. The other class of "contact element" G consists of the same device inverted but open at the small end.

The upright and the inverted "contact elements" are arranged alternately throughout the height of the tower. The apexes of the upright "contact elements" F are closed as shown at F'. The bases G' of the inverted "contact elements" G extend to the periphery of the tower and the bases $F^2$ of the upright elements do not extend quite so far. The apexes $G^2$ of the inverted elements G are open and the arrangement is therefore such that the liquid trickles down the outside of an upright element F and then down the inside of an inverted element G, then down the outside of an upright element and so on while the gas coming upward through the tower has to pass inward through the overlapping rings H of the inverted elements G and outward through the overlapping rings of the upright elements F. The lowermost element G may be open at the bottom as shown to permit a portion of the gas to flow directly therein, or closed to cause all of the gas to flow through the overlapping rings H of the elements G.

Conveniently a number of such towers may be used in series. Two towers are indicated in the drawings. The gas may pass from the inlet B at the bottom of the tower to the outlet C at the top of the tower and thence to the inlet B at the bottom of the next tower in series; while the liquid passes in the opposite direction in the tower, being raised by any suitable means such as the pump K from the outlet E of the one tower to the inlet D of the next tower in series.

What I claim as my invention and desire to secure by Letters Patent is:—

1. An apparatus of the kind described comprising two or more pairs of conical or pyramidal contact-elements, each comprising a series of overlapping conical or pyramidal rings spaced apart, the single "contact-elements" being arranged alternately upright and inverted so that the liquid in falling is alternately moved from the center of the tower to the periphery and vice versa.

2. An apparatus of the kind described comprising two or more pairs of conical or pyramidal "contact-elements" each comprising a series of overlapping conical or pyramidal rings spaced apart, the single "contact-elements" being arranged alternately upright and inverted so that the liquid in falling is alternately moved from the center of the tower to the periphery and vice-versa, the apexes of the upright pyramidal "contact-elements" being closed and the bases of the inverted elements extending to the periphery of the tower.

3. In an apparatus for treating an ore suspended in water with a gas such as $SO_2$ the combination with a series of towers, each having one or more pairs of conical contact elements with overlapping conical rings, of conduits to lead the gas successively from the top of one tower to the bottom of the next, and means for leading the liquid containing ore in suspension from the bottom of one tower to the top of the next.

In testimony whereof I have signed my name to this specification in the presence of two subscribing witnesses.

HENRY THOMAS DURANT.

Witnesses:
SHIRLEY LANIG FADD,
GERALD STEELE.